(12) United States Patent
Corghi

(10) Patent No.: US 11,836,947 B2
(45) Date of Patent: Dec. 5, 2023

(54) SYSTEM FOR CALIBRATING A VEHICLE CAMERA

(71) Applicant: NEXION S.p.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 0 days.

(21) Appl. No.: 16/432,194

(22) Filed: Jun. 5, 2019

(65) Prior Publication Data

US 2020/0105018 A1 Apr. 2, 2020

(30) Foreign Application Priority Data

Sep. 28, 2018 (IT) ........................ 102018000009030

(51) Int. Cl.

| | |
|---|---|
| *G06T 7/80* | (2017.01) |
| *G05D 1/02* | (2020.01) |
| *H04N 23/54* | (2023.01) |
| *B60R 11/04* | (2006.01) |
| *B60R 21/013* | (2006.01) |

(52) U.S. Cl.
CPC ............. *G06T 7/80* (2017.01); *G05D 1/0246* (2013.01); *H04N 23/54* (2023.01); *B60R 11/04* (2013.01); *B60R 21/013* (2013.01); *G05D 2201/0213* (2013.01); *G06T 2207/30252* (2013.01)

(58) Field of Classification Search
CPC . G06T 7/80; G06T 2207/30252; B60R 11/04; G05D 2201/0213; G05D 1/0246; H04N 5/2253
See application file for complete search history.

(56) References Cited

U.S. PATENT DOCUMENTS

| | | | | |
|---|---|---|---|---|
| 6,823,601 | B2 * | 11/2004 | Murray | G01B 11/27 33/288 |
| 7,424,387 | B1 | 9/2008 | Gill et al. | |
| 9,170,101 | B2 * | 10/2015 | Stieff | G01S 13/931 |
| 9,511,712 | B2 * | 12/2016 | Kim | B60R 1/00 |
| 9,545,966 | B2 * | 1/2017 | Kim | G01M 17/007 |
| 10,852,392 | B2 * | 12/2020 | Park | G01S 7/4026 |

(Continued)

FOREIGN PATENT DOCUMENTS

| | | |
|---|---|---|
| DE | 10 2010 062 696 A1 | 6/2012 |
| EP | 2 233 365 A2 | 9/2010 |

(Continued)

OTHER PUBLICATIONS

Opinione Scritta issued in IT Application No. 201800009030 (filing date of Sep. 28, 2018) completed on Mar. 12, 2019 (8 pages).

*Primary Examiner* — Boubacar Abdou Tchoussou
(74) *Attorney, Agent, or Firm* — Wentsler LLC

(57) ABSTRACT

A system for adjusting a sensor of a vehicle comprises: a base unit; a support structure connected to the base unit; and a vehicle calibration assistance structure mounted on the support structure and including a target panel, which has a surface facing forward towards a service area. The surface of the target panel bears a combination of predetermined graphical features, and the vehicle is positioned in the service area. A processing system is operatively connected to the vehicle calibration assistance structure. A positioning device aids with the relative positioning between the vehicle and the vehicle calibration assistance structure.

17 Claims, 7 Drawing Sheets

(56) References Cited

U.S. PATENT DOCUMENTS

| | | | |
|---|---|---|---|
| 10,921,426 B2* | 2/2021 | Tang | G01S 7/40 |
| 11,175,381 B2* | 11/2021 | Wang | G01S 13/931 |
| 11,215,695 B2* | 1/2022 | Shen | G01S 7/4086 |
| 2011/0077900 A1* | 3/2011 | Corghi | G01B 11/2755 |
| | | | 702/150 |
| 2011/0310250 A1 | 12/2011 | Inui et al. | |
| 2012/0233841 A1 | 9/2012 | Stein | |
| 2013/0325252 A1 | 12/2013 | Schommer | |
| 2015/0134191 A1* | 5/2015 | Kim | G01M 17/007 |
| | | | 701/29.7 |
| 2015/0145999 A1* | 5/2015 | Kim | B60R 1/00 |
| | | | 348/148 |
| 2016/0161602 A1* | 6/2016 | Prokhorov | G01S 7/4972 |
| | | | 702/97 |
| 2018/0100783 A1* | 4/2018 | Stieff | H04N 9/3179 |
| 2019/0204425 A1* | 7/2019 | Abari | G01S 7/40 |
| 2019/0249985 A1* | 8/2019 | Stieff | G01B 11/272 |
| 2019/0392610 A1* | 12/2019 | Cantadori | G01S 7/4972 |
| 2021/0356262 A1* | 11/2021 | Uffenkamp | G01S 7/4972 |

FOREIGN PATENT DOCUMENTS

| | | |
|---|---|---|
| EP | 2 302 318 B1 | 12/2014 |
| EP | 3 084 348 B | 3/2017 |
| WO | 2015/133414 A1 | 9/2015 |
| WO | 2018/067354 A1 | 4/2018 |
| WO | 2018/153723 A1 | 8/2018 |

* cited by examiner

SYSTEM FOR CALIBRATING A VEHICLE CAMERA

BACKGROUND

1. Field of the Invention

This invention relates to a system for calibrating a vehicle camera and to a method for aligning or calibrating a vehicle camera. In particular, by vehicle is meant a motor car, a lorry, a truck or other wheeled vehicle.

In particular, the field of this application is the calibration or alignment of the vehicle's sensors such as radar sensors or optical sensors (cameras) used in safety systems designed to prevent frontal collisions or in cruising speed control systems.

2. Description of Related Art

In this field, it is common practice to use structures comprising a target panel bearing a graphical feature, placed in front of the vehicle and imaged by the vehicle sensor to be calibrated or aligned. For example, a system for aligning a vehicle sensor is described in patent document WO2018/067354A1. This system includes a support structure supporting a target panel used to align or recalibrate the vehicle's safety sensors; the support structure is movable on wheels and the target panel is movable on the support structure because it needs to be suitably positioned during the procedure for aligning or recalibrating the sensors. Positioning the target panel relative to the vehicle can be done automatically using optical devices attached to the support structure to image the vehicle; this solution is not very suitable for optimum, high-precision positioning of the support structure relative to the vehicle.

Also, as mentioned above, the target panel bears a graphical feature which the vehicle sensor "sees" during the procedure; this graphical feature is typical not only of the type of sensor to be calibrated or aligned but also of the vehicle make or model. Thus, this system requires that workshops responsible for adjusting the vehicle sensors be equipped with a large number of target panels and, each time the operator needs to adjust the sensors, the target panel suitable for the specific vehicle must be selected and mounted on the support structure. It is evident that using a system of this kind is onerous not only because it is time-consuming but also because it requires a certain amount of workshop space to store the target panels and is not really practical.

Patent document WO2018/153723A1 provides a calibration assistance system for vehicle sensors; the system comprises a screen on which an image that provides the graphical feature to be imaged by the vehicle sensor is displayed; the image is deformed as a function of the relative position between the screen and the vehicle. In fact, document WO2018/153723A1 does not envisage the use of devices for assisting with the positioning of the screen and the vehicle relative to each other and positioning errors are corrected by deforming the image displayed on the screen. Thus, based on the relative position between the screen and the vehicle, the system is required to process the size of the image that is suitable for that position; this type of processing requires considerable computer power which translates as a system which is complex, expensive and not practical.

BRIEF SUMMARY

This disclosure has for an aim to provide a calibrating system for calibrating (and/or adjusting and/or aligning) a camera (or more generally, a sensor) of a vehicle and a method for aligning or calibrating (or adjusting) a camera (or more generally, a sensor) of a vehicle in order to overcome the above mentioned drawbacks of the prior art.

This aim is fully achieved by the system and method of this disclosure as characterized in the appended claims.

In particular, the system of this disclosure is a system for adjusting a sensor (or, more specifically, a camera) of a vehicle. Still more particularly, the system of this disclosure is a system for adjusting a sensor (or, more specifically, a camera) of a motor car, a lorry, a truck or other wheeled vehicle.

According to one aspect of this disclosure, the system is a system for calibrating (or recalibrating) a vehicle sensor.

According to one aspect of this disclosure, the system is a system for aligning (or realigning) a vehicle sensor.

In a preferred embodiment, the sensor to be aligned or recalibrated is a camera.

In an embodiment, the sensor to be aligned or recalibrated is a safety sensor of an ADAS (advanced driver-assistance system). In an embodiment, the sensor to be aligned or recalibrated is a radar sensor. In an embodiment, the sensor to be aligned or recalibrated is an ultrasonic sensor. In an embodiment, the sensor to be aligned or recalibrated is a LIDAR sensor.

In an embodiment, the system comprises a base unit.

In an embodiment, the system comprises a support structure. The support structure is connected to the base unit.

In an embodiment, the system comprises a vehicle calibration assistance structure. The vehicle calibration assistance structure is mounted on (that is, connected to) the support structure. In an embodiment, the vehicle calibration assistance structure includes a target panel. In an embodiment, the target panel has a surface which faces the service area. The vehicle is positioned in the service area. In an embodiment, the vehicle is positioned in such a way that a camera on the vehicle can image the surface of the target panel. In an embodiment, the surface of the target panel facing towards the service area bears a first combination of predetermined graphical features.

It should be noted that, in the context of this disclosure, the expression "combination of graphical features" is used to denote a group or set of graphical elements which can be recognized by a camera.

In an embodiment, the system comprises a processing system. The processing system is operatively connected to the vehicle calibration assistance structure. In an embodiment, the processing system is programmed to process data received from the vehicle calibration assistance structure in order to facilitate alignment or calibration of the vehicle camera.

The system comprises a positioning device. The positioning device is configured to aid with the relative positioning between the vehicle and the vehicle calibration assistance structure.

In an embodiment, the positioning device is located in the service area in front of the support structure. In an embodiment, the positioning device is located on the edge of the service area. In an embodiment, the positioning device is spaced from the support structure. In an embodiment, the positioning device includes an optical device, oriented towards the service area to see graphical features of the vehicle. In an embodiment, the optical device is oriented sideways, that is, in a lateral direction, towards the vehicle. By "lateral direction" is meant a direction transverse to a forward direction (the direction from the support structure to the service area) and to a backward direction (opposite to the forward direction). In an embodiment, the positioning device includes a matching camera which is oriented towards the support structure to see a second combination of predetermined graphical features of the support structure. The matching camera is oriented in a backward direction, towards the support structure.

The positioning device allows the vehicle to be positioned precisely relative to the support structure. Thus, before calibrating the sensor, the vehicle must be positioned in such a way that the sensor can see the first graphical feature from an optimum position. This position can be reached in a particularly easy and effective manner thanks to the positioning device.

In an embodiment, the positioning device is of the type described in patent document EP3084348B1, in the name of the present Applicant and incorporated herein by reference. It is expressly understood that all the functional and structural features of the apparatus of patent document EP3084348B1 can be applied to this embodiment of the system described herein.

In an embodiment, the positioning device is of the type described in patent document EP2302318B1, in the name of the present Applicant and incorporated herein by reference. It is expressly understood that all the functional and structural features of the apparatus of patent document EP2302318B1 can be applied to this embodiment of the system described herein.

In an embodiment, the processing system is configured to display on the surface of the target panel an image which provides the first combination of predetermined graphical features visible to the vehicle's camera. Preferably, the first combination of predetermined graphical features is a function of the vehicle. Thus, a virtual graphical feature is displayed on the surface of the target panel. In light of this, it is not necessary to change the target panel for every vehicle whose sensors must be calibrated: that is because a variety of different graphical features can be displayed on a single target panel.

In an embodiment, the system comprises an operator interface configured to receive input data comprising one or more of the following information items regarding the vehicle: vehicle make, vehicle model, year of vehicle manufacture, vehicle identifier code. The processing system is connected to the operator interface to receive the input data therefrom and is configured to generate the image as a function of the input data. In effect, depending on the type of vehicle (make, model, year of manufacture, identifier code) a certain first graphical feature is necessary. Thus, the target panel displays an image having a combination of the predetermined graphical features based on the type of vehicle whose sensors have to be adjusted. This avoids having to replace the target panel each time a different vehicle needs to be subjected to the procedure, with evident advantages in terms of time saving and convenience of the procedure.

In an embodiment, the processing system is operatively coupled to the positioning device to receive data therefrom and includes a processor programmed with instructions to process the data received from the positioning device to determine measurements including at least one spatial correlation between the vehicle calibration assistance structure and the vehicle.

In an embodiment, the processing system is configured to generate the image as a function of the measurements.

In effect, if the camera is designed to see objects from a long distance—for example, a few hundred metres away—the target panel should be positioned a long distance away from the vehicle; the use of a virtual image allows keeping the target panel a short distance away while working on the virtual image to obtain a target which is equivalent to the one that would be obtained if the panel was really a long distance away. Thus, it is possible to position the vehicle at a certain distance from the vehicle calibration assistance structure (that is, from the target panel) and to generate an image that is a function of that distance; for example, if the distance is very short, an image of reduced size is generated. In fact, vehicle manufacturers specify a predetermined distance between the target panel and the vehicle.

In an embodiment, the processing system is configured to display on the surface of the target panel an additional image which provides the second combination of predetermined graphical features.

In an embodiment, the processing system is configured to display the additional image on a pair of side portions of the target panel to provide the second combination of predetermined graphical features. By side portions are meant areas disposed in proximity to opposite sides of the target panel.

In an embodiment, the processing system is configured to display the image providing the first combination of predetermined graphical features on a central portion of the target panel, interposed between the side portions of the pair of side portions. The image and the additional image are therefore displayed in distinct zones of the target panel (at different time instants or at the same time instant).

In an embodiment, the processing system is configured to display the additional image and the image one after the other at successive times on the surface of the target panel. Thus, the image is displayed first, followed by the additional image (in different zones of the target panel or in the same zone or in overlapping zones).

Thus, in an embodiment, the same target panel is used during a step of positioning to display the second combination of predetermined graphical features (which must be seen by the matching camera of the positioning device) and then, during a step of calibrating (with vehicle and target panel already at the optimum position), the first combination of predetermined graphical features (which must be seen by the sensor to be calibrated), in order to calibrate the sensor or camera of the vehicle.

In an embodiment, the target panel includes a screen (or monitor or image display unit). The processing system is configured to transmit to the screen a control signal representing the graphical image to be displayed (that is, the first graphical feature and/or the second graphical feature). The use of a target panel that comprises a screen has several advantages, including high luminosity and high contrast even in brightly lit spaces.

In an embodiment, the system includes a projector. The processing system is operatively connected to the projector to generate a light beam directed at the surface of the target panel to generate the image.

In an embodiment, the position of the projector relative to the target panel is predetermined. In an embodiment, the image projected on the target panel depends on the relative position between the projector and the target panel.

In an embodiment, the processing system is configured to transmit to the projector a control signal representing the graphical image to be displayed (that is, the first graphical feature and/or the second graphical feature). The use of a target panel on which to project the image offers advantages in terms of limited costs and high flexibility in defining the size of the image.

In an embodiment, the vehicle calibration assistance structure comprises a positioning target element. The positioning target element includes a surface bearing the second combination of predetermined graphical features. The positioning target element is supported by the support structure and is oriented towards the service area.

In an embodiment, the position of the positioning target element relative to the target panel, and hence relative to the first combination of graphical features, is predetermined. In an embodiment, the position of the positioning target element relative to the target panel is determined by a step of calibrating the calibration assistance structure. In an embodiment, this calibration is performed using a camera—for example, the matching camera—which simultaneously displays the position of the calibrating target and the first combination of graphical features.

In an embodiment, the positioning target element is oriented in a forward direction, towards the service area. In the context of this disclosure, it should be noted that "forward direction" means the direction from the support structure to the service area. By "backward direction" is meant, vice versa, the direction from the service area to the support structure (opposite to the "forward" direction).

In an embodiment, the calibration assistance structure comprises a pair of positioning target elements, supported by the support structure and protruding from respective opposite sides of the target panel. In an embodiment, the positioning target elements of this pair are fixed to opposite sides of the target panel.

In an embodiment, the positioning target element (or positioning target elements) is attached to the target panel. Thus, the second combination of predetermined graphical features may be displayed on the target panel itself or it may appear on a positioning target element (or a pair of positioning target elements) connected to the support structure; these two solutions might also coexist in the same system, allowing the operator to choose whether to perform positioning by displaying the second graphical feature on the target panel or using the positioning target element.

In an embodiment, the optical device comprises at least one camera. Preferably, the optical device comprises a pair of cameras in a stereo configuration. The cameras of this pair are configured to see graphical features of the vehicle; for example, of the wheel.

In an embodiment, the processing system is configured to generate a plurality of images in sequence. In effect, some alignment/calibration procedures require the vehicle to be moved between a plurality of static positions; according to an aspect of this disclosure, therefore, the vehicle is not really moved from one position to another but instead, a plurality of images are generated in succession.

In an embodiment, the vehicle calibration assistance structure, which is supported by the support structure, includes a reflector. In an embodiment, the reflector includes a metallic surface. In an embodiment, the reflector is configured to reflect electromagnetic waves. In an embodiment, the reflector is configured to facilitate alignment or calibration of a radar sensor of a vehicle safety system.

In an embodiment, the reflector is movable relative to the support structure. In an embodiment, the support structure is configured to vary the distance of the reflector from an axis of the vehicle. In an embodiment, the support structure is configured to vary the inclination of the reflector.

In an embodiment, the vehicle calibration assistance structure includes a calibrating unit (e.g., a target panel) for the vehicle's night vision systems (for example, infrared sensors).

In an embodiment, the reflector is removably connected to the vehicle calibration assistance structure (that is, to the support structure).

In an embodiment, the target panel along at least one portion of the support structure. In an embodiment, the target panel is slidable along the at least one portion of the support structure in a vertical direction (parallel to the weight force).

In an embodiment, the base unit includes a plurality di wheels, configured to allow the base unit to be moved on the flat surface (preferably horizontal) which supports it.

Thus, in an embodiment, the target panel is movable in a horizontal plane as one with the base unit and with the support structure and in the vertical direction, thanks to its sliding in the vertical direction.

In an embodiment, the support structure is configured to vary the inclination of the target panel.

In an embodiment, the processing system is programmed to determine measurements including at least one correlation between the target panel and the at least one portion of the support structure (for example, the height at which the target panel is mounted on the support structure).

In an embodiment, the vehicle calibration assistance structure includes an optical projection system including at least one laser emitter (projector). In an embodiment, the processing system is operatively coupled to the optical projection system to activate the laser emitter to project a ray onto a surface in proximity to the system or adjusting the sensor of a vehicle. In an embodiment, the processing system is connected to the optical projection system to determine a distance between the laser projector and the surface on which the laser ray is projected (which may be a surface of the vehicle). The optical projection system is useful, in particular, for prepositioning the calibration assistance structure relative to a predetermined point or to an axis of the vehicle (for example, axis of symmetry or thrust axis) according to the manufacturer's specifications.

In an embodiment, the vehicle calibration assistance structure includes a distance measuring system. In one embodiment, the distance measuring system is an optical (laser) system. In another embodiment, the distance measuring system is an ultrasonic system.

The distance measuring system is useful, in particular, for prepositioning the calibration assistance structure at a predetermined, factory-set distance from the vehicle.

This disclosure also provides a method for aligning or calibrating a camera (or more generally, a sensor) of a vehicle positioned in a service area. More generally speaking, the method of this description is a method for adjusting a sensor of a vehicle.

In an embodiment, the method comprises a step of providing a support structure which supports a vehicle calibration assistance structure. The vehicle calibration assistance structure includes a target panel having a surface which faces the service area so that a camera of the vehicle can see the surface of the target panel. In an embodiment, the surface of the target panel bears a first combination of predetermined graphical features.

In an embodiment, during the step of providing, the calibration assistance structure is pre-positioned at a position specified by the vehicle manufacturer. In an embodiment, the calibration assistance structure is prepositioned relative to the vehicle with the aid of a distance measuring system and/or a laser projector.

In an embodiment, the method comprises a step of sending a calibration command to an electronic control unit of the vehicle.

In an embodiment, the method comprises a step of viewing the image displayed on the target panel through the vehicle camera to be calibrated. The step of viewing is started by the calibration command. In an embodiment, once the camera has viewed the image, the electronic control unit sends response data to the processing system. In an embodiment, the response data relate to the outcome of the calibration command. In an embodiment, the response data contain instructions for fine tuning or adjusting the position.

In an embodiment, the method comprises a step of processing data received in the processing system from the calibration assistance structure and from the control unit of the vehicle.

In an embodiment, the method comprises a step of providing a positioning device.

The positioning device includes an optical device, oriented towards the service area to see graphical features of the vehicle. Preferably, the graphical features of the vehicle comprise features relating to the wheels of the vehicle. The optical device is oriented in a lateral direction. In an embodiment, the positioning device also includes a matching camera which is oriented towards the support structure. The matching camera is oriented in a backward direction.

The method comprises a step of aiding with the relative positioning between the vehicle positioned in the service area and the vehicle calibration assistance structure. Preferably, the step of aiding with the positioning includes viewing the graphical features of the vehicle through the optical device. Preferably, the step of aiding with the positioning includes viewing a second combination of predetermined graphical features of the support structure through the matching camera.

Thanks to the step of aiding with the positioning performed with the positioning device, the vehicle and the calibration assistance structure are positioned very precisely relative to each other.

In an embodiment, the method comprises a step of displaying (that is, generating) on the surface of the target panel an image having a predetermined graphical feature visible to the camera of the vehicle.

In an embodiment, the method comprises a step of displaying (that is, generating) on the surface of the target panel an additional image having a second combination of predetermined graphical features visible to the matching camera of the positioning device. The step of generating the additional image is preferably part of the step of positioning. Thus, the additional image is generated on the target panel during the step of positioning, and after that, the image seen by the camera during the step of viewing is generated.

In an embodiment, the step of aiding with the positioning comprises viewing through the matching camera a positioning target element bearing a second combination of predetermined graphical features. The second graphical feature is displayed on the support structure.

In an embodiment, the method comprises a step of generating on the surface of the target panel an image representing the first combination of predetermined graphical features visible to the camera of the vehicle.

In an embodiment, the target panel includes a screen to which the processing system, during the step of displaying, transmits a control signal representing the image to be displayed.

In an embodiment, the image is projected on the target panel by a projector to which the processing system transmits a control signal representing the image to be displayed.

In an embodiment, the method comprises a step of generating on the surface of the target panel an additional image having a second combination of predetermined graphical features visible to the matching camera of the positioning device.

In an embodiment, the second graphical feature is displayed on a positioning target element (or a pair of positioning target elements) connected to the target panel.

In an embodiment, the step of aiding with the positioning includes processing data received from the positioning device in a processing system. In an embodiment, the step of aiding with the positioning includes a step of determining measurements which include at least one spatial correlation between the vehicle calibration assistance structure and the vehicle.

In an embodiment, the image is generated by the processing system as a function of the measurements.

BRIEF DESCRIPTION OF SEVERAL VIEWS OF THE DRAWING

These and other features are more apparent from the following description of a preferred embodiment, illustrated by way of non-limiting example in the accompanying drawings, in which:

FIG. 1A shows the positioning device of FIG. 1;

DETAILED DESCRIPTION

Figure 1:
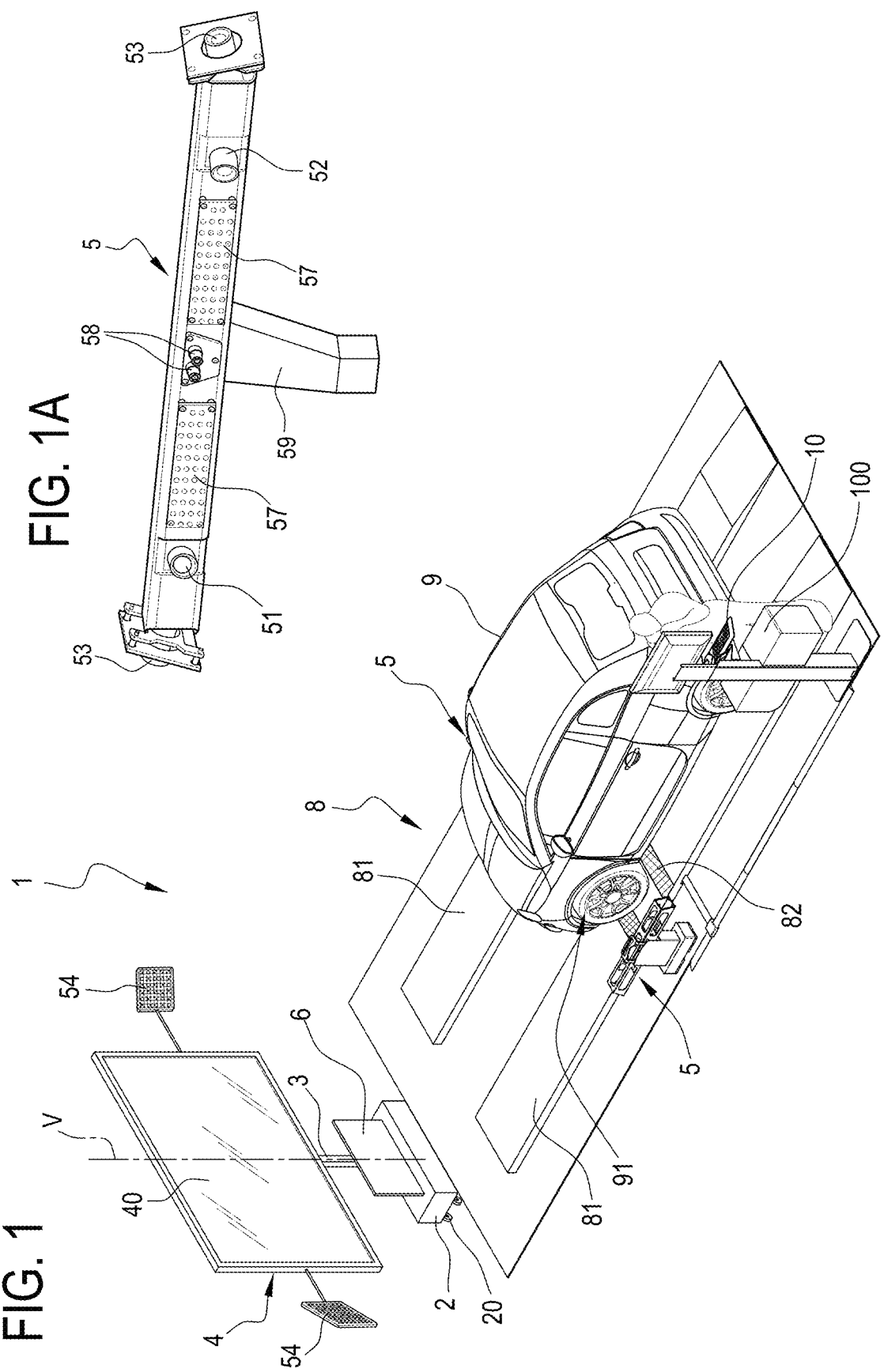
FIG. 1 shows a vehicle positioned in a service area and a possible embodiment of an adjustment system according to this disclosure.
Figure 2:
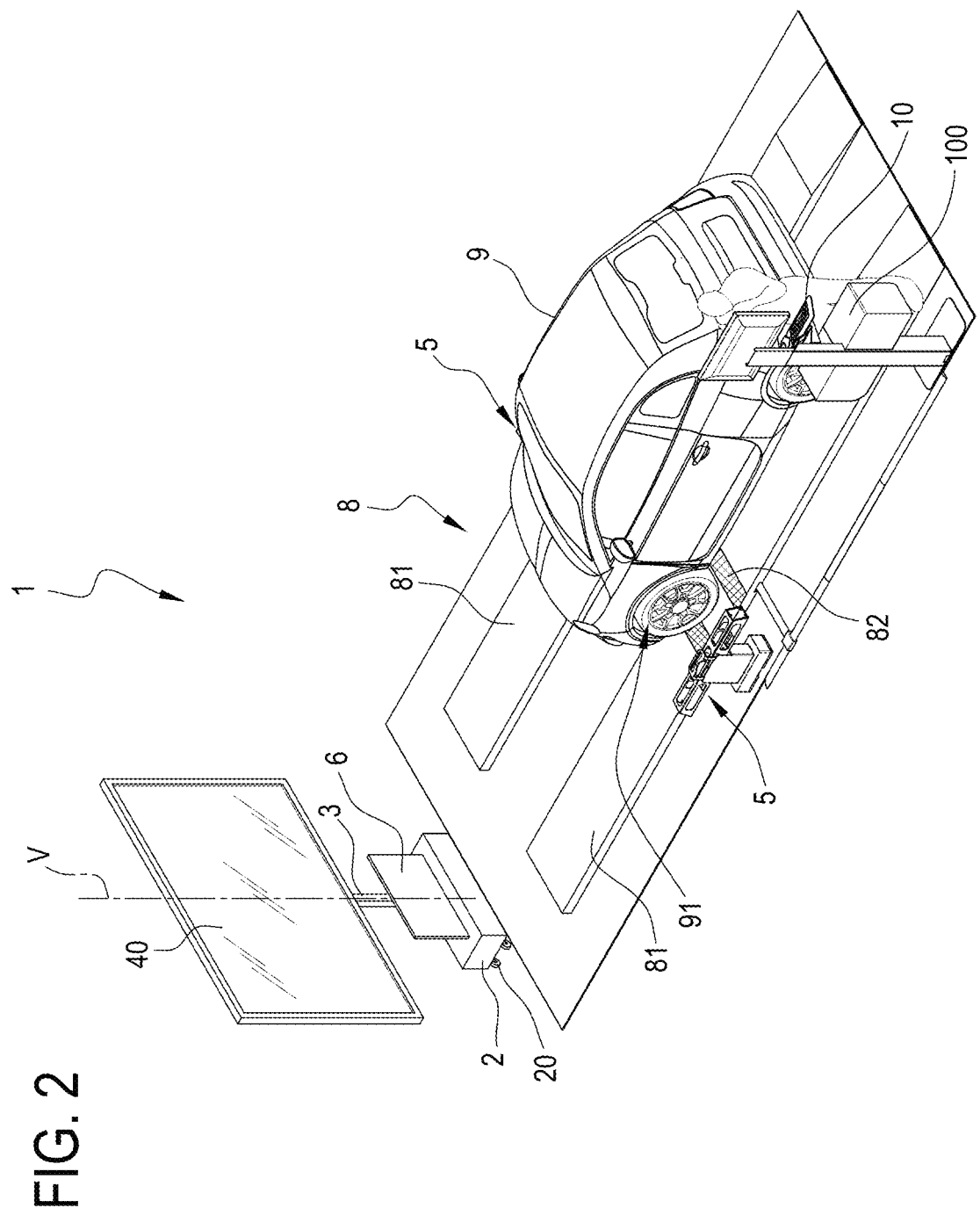
FIGS. 2, 3, 4, 5 show the vehicle and the adjustment system of FIG. 1 in respective embodiments.
Figure 3:
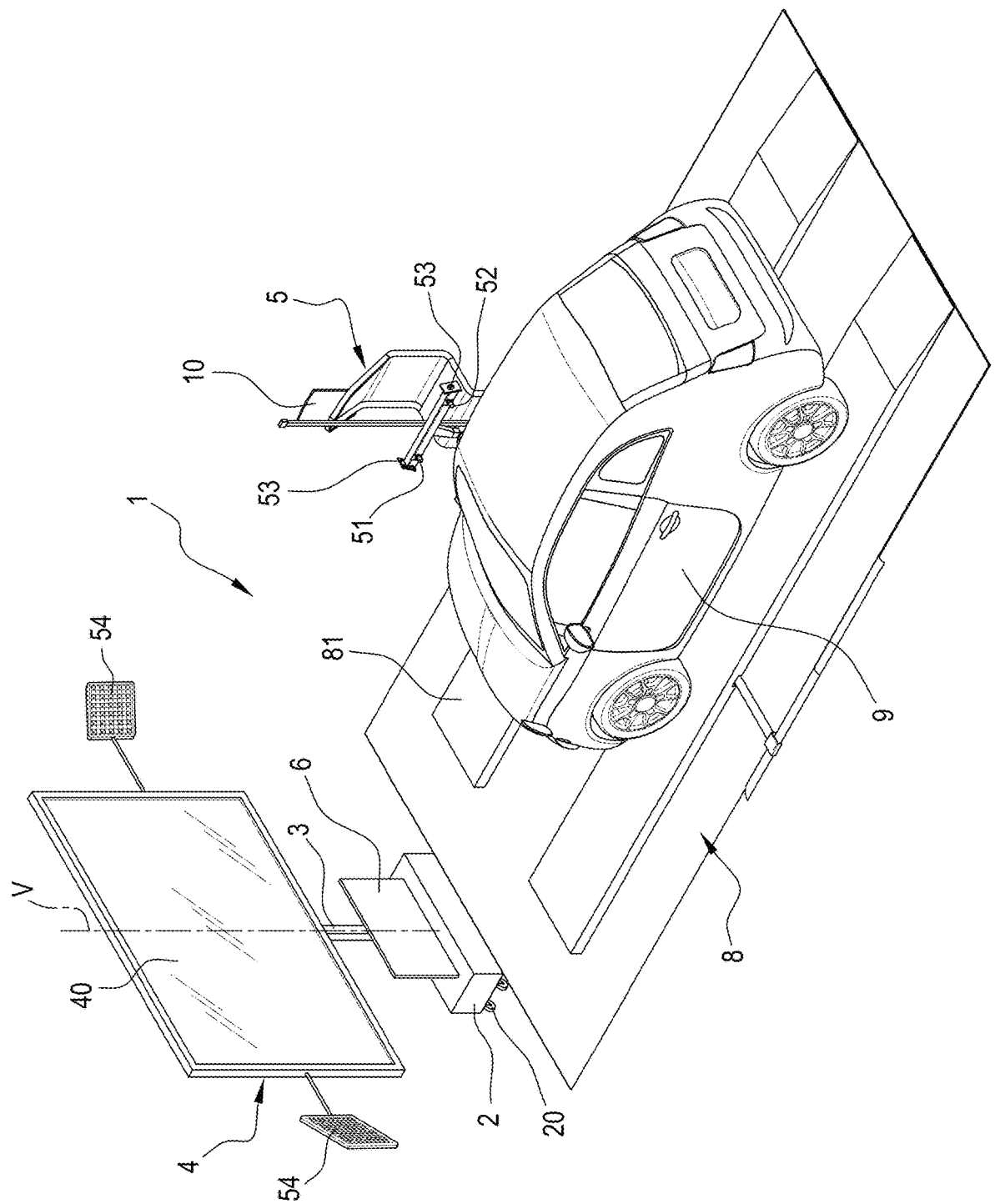
Figure 3A:
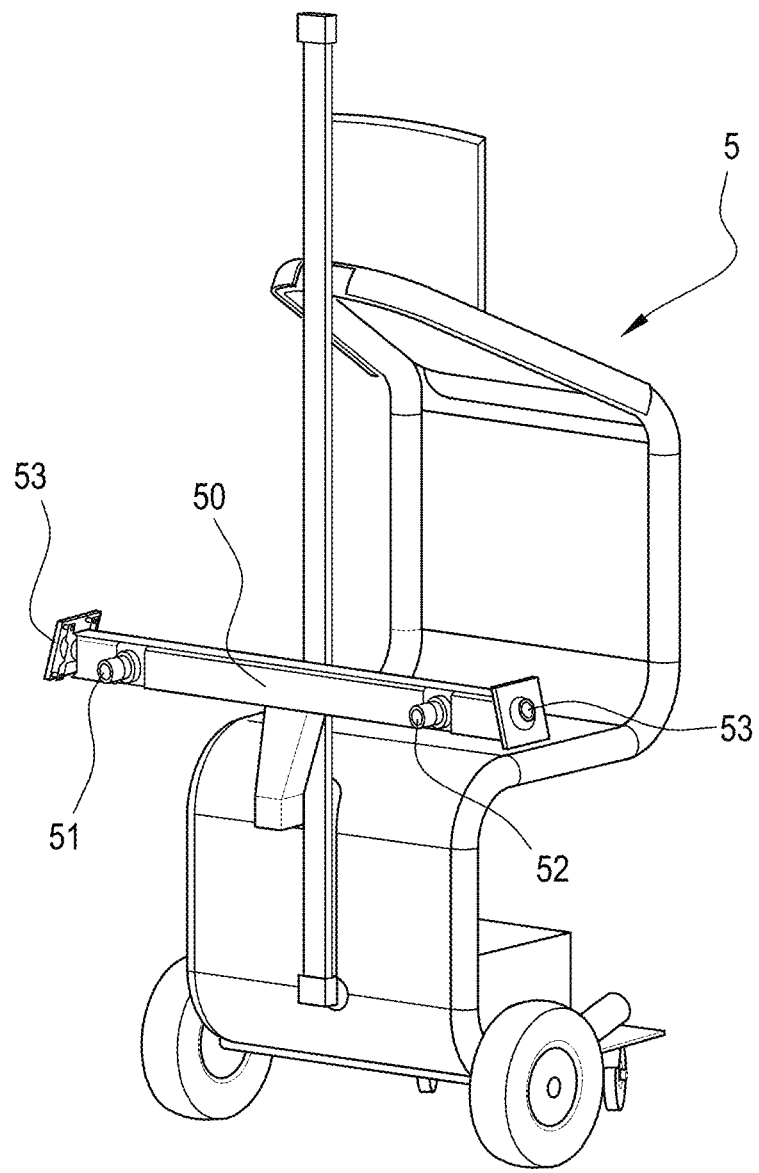
FIG. 3A shows the positioning device of FIG. 3.
Figure 4:
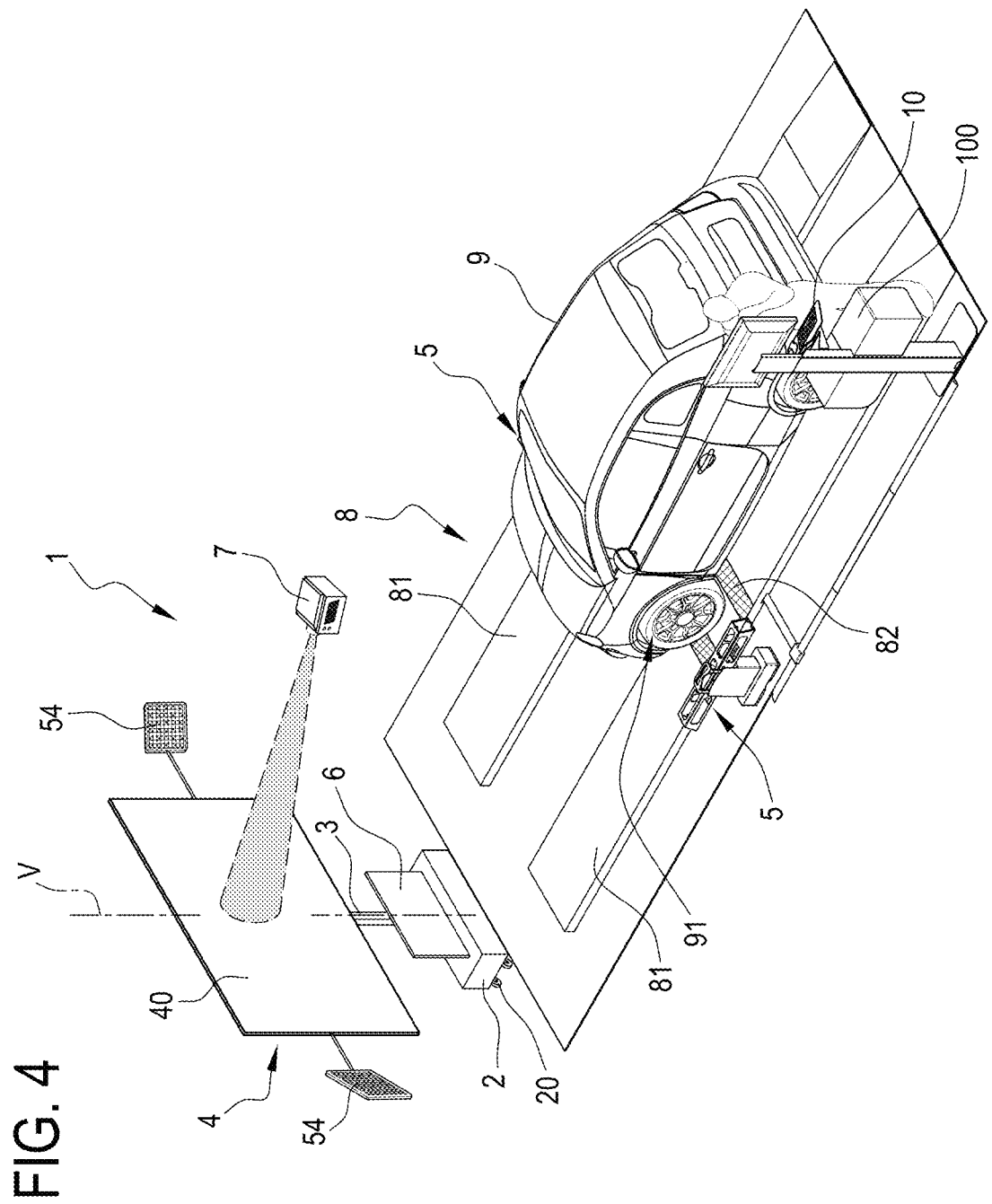
Figure 5:
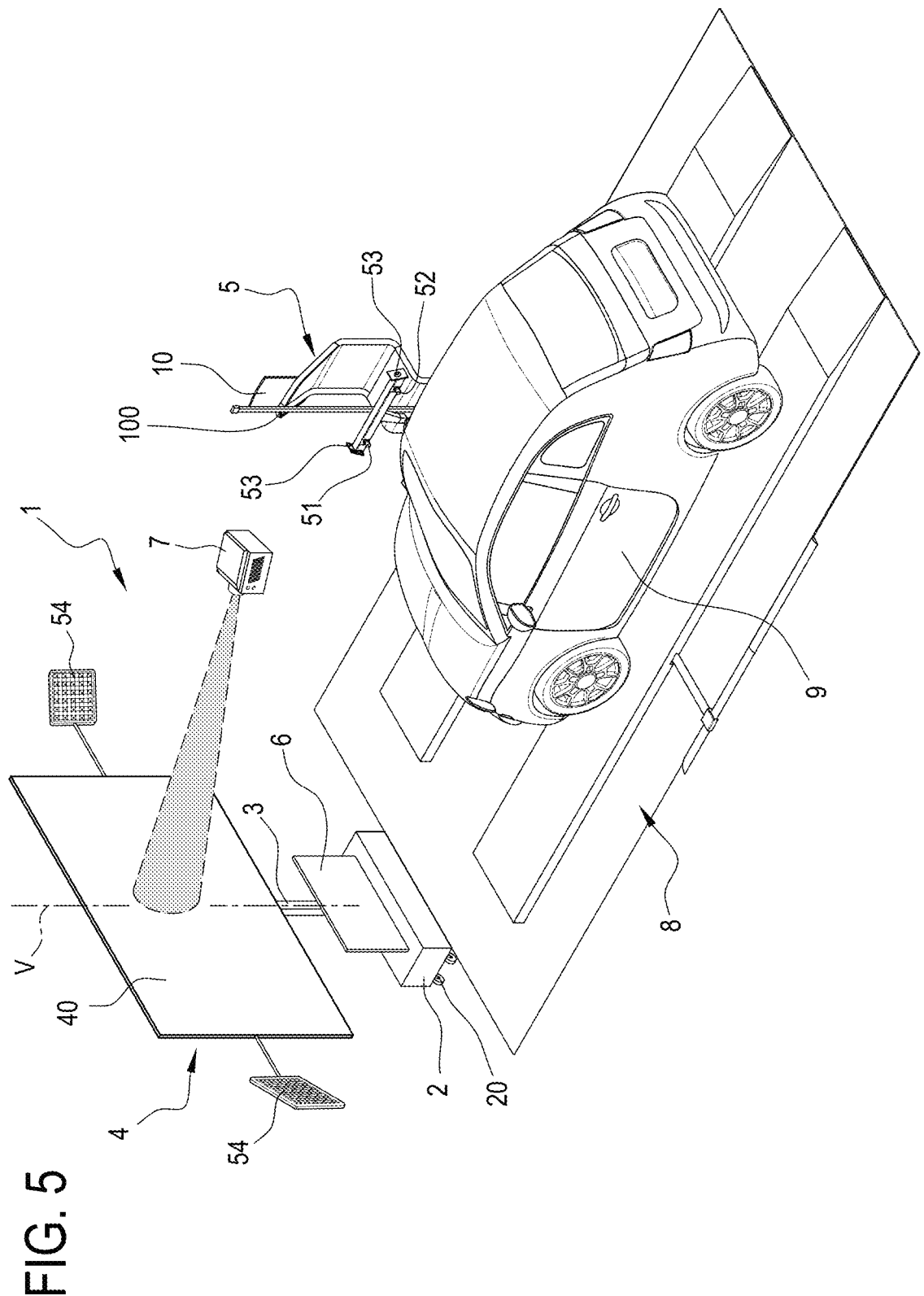
Figure 6A:
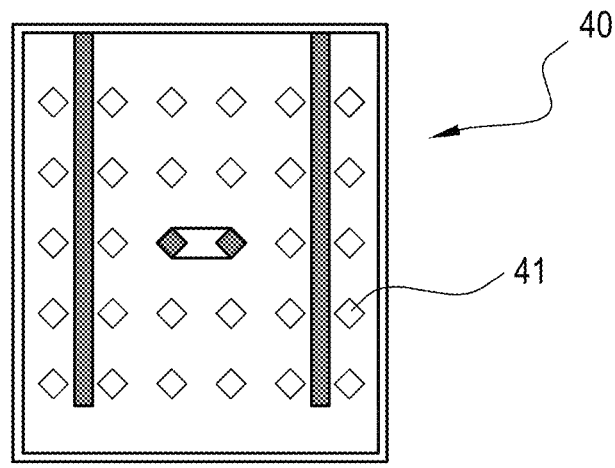
FIGS. 6A, 6B and 6C show respective images displayed on the target panel of the system of any one of FIGS. 1, 2, 3, 4, 5.
Figure 6B:
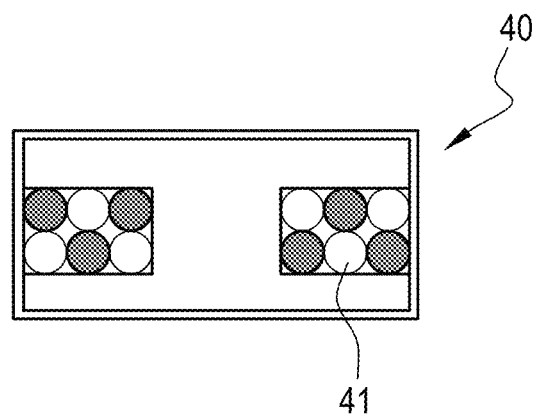
Figure 6C:
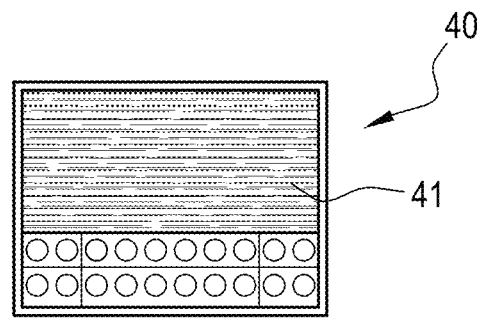

With reference to this disclosure, the numeral 1 denotes a system for adjusting (that is, aligning and/or calibrating) a sensor of a vehicle 9.

The sensor of the vehicle 9 which has to be calibrated preferably includes a front camera. In an embodiment, the front camera forms part of a safety system (for example, anti-collision, lane detection, road sign recognition, or the like) of the vehicle 9.

The system 1 comprises a base unit 2. The base unit 2 comprises a plurality of wheels 20. The wheels 20 are configured to allow the base unit 2 to move on a supporting surface.

The system 1 comprises a support structure 3. The support structure 3 is connected to the base unit 2.

The system 1 comprises a vehicle calibration assistance structure 4. The vehicle calibration assistance structure 4 is mounted on the support structure 3.

In an embodiment, the vehicle calibration assistance structure 4 is removably attached to the support structure 3. In an embodiment, the vehicle calibration assistance structure 4 is slidable along the support structure 3 in a vertical direction V (parallel to the weight force). In an embodiment, the vehicle calibration assistance structure 4 is pivotable about a horizontal axis (perpendicular to the vertical direction V). In an embodiment, the vehicle calibration assistance structure 4 is slidable along the support structure 3 in the horizontal direction.

Thanks to the wheels 20 of the base unit 2, the support structure 3 (that is, the vehicle calibration assistance structure 4) can be moved manually to a predetermined distance from the vehicle 9. In effect, different vehicles 9 may require the support structure 3 (that is, the vehicle calibration assistance structure 4) to be located at different positions relative to the vehicle 9. In an embodiment, at least one wheel 20 comprises a locking device configured to prevent accidental movement of the support structure 3 during use.

In an embodiment, the vehicle calibration assistance structure 4 includes a target panel 40. The target panel 40 has a surface which faces the service area 8 in which the vehicle 9 is positioned. The camera of the vehicle 9 sees the surface of the target panel 40. In an embodiment, the surface of the target panel 40 has high contrast.

The apparatus comprises two tracks 81 for contact with the tyres of the wheels 91 of the vehicle 9. The tracks 81 run parallel to each other and are oriented in a longitudinal direction.

The tracks 81 define respective stretches 82. The stretches 82 of the tracks 81 are substantially aligned along a direction transverse (perpendicular) to the longitudinal direction of extension of the tracks 81 themselves.

Preferably (but not necessarily) a floorplate configured to be surmounted by a wheel 91 of the vehicle 9 is located on at least one of the stretches 82 of the tracks 6.

Preferably, the floorplate is free to be moved along a transverse direction perpendicular to the longitudinal direction. This allows relieving stress from the wheel 91 of the vehicle 9 resting thereon.

In an embodiment, the target panel 40 can be positioned at a plurality of positions on the support structure 3 (depending on the height of the camera on the vehicle 9). In an embodiment, the target panel 40 comprises a blocking member configured to block it at a certain height along the support structure 3.

The system 1 comprises a processing system. In an embodiment, the processing system is configured to display an image 41 on the surface of the target panel 40. The image 41 provides a predetermined graphical feature. The graphical feature is a function of the vehicle 9 (for example, make or model).

In an embodiment, the processing system is operatively connected to the vehicle calibration assistance structure 4 to process data received from the vehicle calibration assistance structure 4 in order to facilitate alignment or calibration of the camera of the vehicle 9.

More specifically, in an embodiment, the system 1 comprises a positioning device 5, configured to aid with the relative positioning between the vehicle 9 and the vehicle calibration assistance structure 4. In an embodiment, the positioning device 5 is movable on wheels. In an embodiment, the positioning device 5 is movable on an elongate guide which extends in longitudinal direction.

In an embodiment, the apparatus 1 comprises a first and a second positioning device 5 positioned on the outside of the tracks 81 on opposite sides, in proximity to, and directed towards, corresponding stretches 82 of the tracks 81. In an embodiment, the first and second positioning devices are movable on respective guides.

Preferably, the positioning device 5 (or each of the positioning devices 5) comprises an optical device.

The optical device comprises at least one camera; preferably it comprises a pair of cameras 51, 52 in a stereo configuration, oriented towards the track 81, corresponding substantially to the height of a wheel 91.

The function of the cameras 51, 52 is to capture images of a wheel 91 positioned on a corresponding track 81 on the stretch 82 (that is, on the floorplate, if there is one) in proximity thereto. The cameras 51, 52 are at a distance from each other to see the wheel 91 through different optical paths.

Further, the optical device preferably comprises at least one matching camera 53 (or field camera).

Further, the positioning device 5 preferably comprises an illuminator 57 configured to generate a beam of light directed at the wheel 91 to be detected.

The illuminator 57 comprises, for example, a plurality of LEDs or other lighting bodies.

Further, the positioning device 5 preferably comprises a projector element 58 adapted to project a structured light beam on the wheel 91. Preferably, the structured light emitted by the projector element 58 is in the infrared range. Still more preferably, the light emitted by the element and which strikes the wheel 91 is detected by the optical measuring system (that is, by the cameras 51, 52).

In an embodiment, the positioning device 5 comprises a position detector element, configured to detect the presence of a wheel 91 on the track 81 (that is, on the corresponding stretch 82 of the track 81) in proximity thereto.

The position detector element comprises, for example, a visible light emitter and a related receiver. Preferably, the element is capable of measuring the distance of the object struck by its own emitted light beam.

It should be noted that in an embodiment, the positioning device 5 is fixed to the floor by corresponding arms 59, at a predetermined position relative to the tracks 81. In an embodiment, the arm 59 is fixed to the floor and the positioning device 5 is fixed. In an embodiment, the arm 59 is slidable on an elongate track extending in the longitudinal direction and the positioning device 5 is movable on that track.

The processing system is operatively coupled to the positioning device 5 to receive data therefrom and includes a processor 100 programmed with instructions to process the data received from the positioning device 5 to determine measurements. In an embodiment, the measurements include a spatial correlation between the vehicle calibration assistance structure 4 and the vehicle 9. In an embodiment, the measurements include a spatial correlation between the target panel 40 and the at least one portion of the support structure 3. In an embodiment, the measurements include a spatial correlation between the target panel 40 and the vehicle 9. In an embodiment, the measurements include a spatial correlation between the target panel 40 and the camera of the vehicle 9 to be calibrated or aligned.

In an embodiment, the system 1 comprises a positioning target element 54 including a surface having a combination of predetermined graphical features. The positioning target element 54 is supported by the support structure 3. The positioning target element 54 is attached to the target panel 40. The positioning target element 54 is oriented in a forward direction towards the service area 8.

In an embodiment, the positioning device 5 is spaced from the support structure 3 and includes an optical device oriented in a lateral direction to see graphical features of the vehicle 9 and a matching camera 53 oriented in a backward direction towards the support structure 3, to see the positioning target element 54. In an embodiment, the positioning device 5 comprises a pair of matching cameras 53 oriented in opposite directions. A first matching camera 53 is oriented towards the vehicle calibration assistance structure 4. A second matching camera 53 is oriented in the opposite direction in order to see target elements located at the back of the vehicle and/or to allow the positioning device 5 to be moved to the opposite side of the service area 8.

The optical device preferably comprises a first camera 51 and a second camera 52.

Precise positioning of the support structure 3 or of the target panel 40 can be performed under the guidance of the processing system as a function of the data captured by the optical device and the matching camera 53. For example, the support structure 3 is placed in front of the vehicle 9, the first and second cameras 51, 52 capture images of the side of a vehicle 9 (for example, of a wheel) and the matching camera 53 captures images of the positioning target element 54; by processing these images, the processing system is able to identify the position of the support structure 3 or of the target panel 40 relative to the vehicle. If adjustments to the relative position are required, the processing system can help an operator to move the support structure 3 or the target panel 40 or the vehicle 9 to reach the correct position. In an embodiment, the processing system includes an operator interface 10 configured to help the operator to reach the correct position. The operator interface may, for example, include a screen, a loudspeaker, a flashing light and a keyboard.

Preferably, the operator interface 10 is also configured to receive input data relating to the vehicle 9 (for example, make, model, year of manufacture, identifier code).

Precise positioning of the support structure 3 or of the target panel 40 can be performed under the guidance of the processing system as a function of the data captured by the first and second cameras 51 and 52. For example, the support structure 3 is placed in front of the vehicle 9, the first and second cameras 51, 52 capture images of the first and second sides of the vehicle 9 (for example, the front and/or rear wheels); by processing these images, the processing system is able to identify the position of the support structure 3 relative to the vehicle. If adjustments to the relative position are required, the processing system can help an operator to move the support structure 3 or the vehicle 9 to reach the correct position.

In an embodiment, the processing system is configured to generate the image 41 as a function of the measurements (that is, of the distance between the vehicle 9 and the vehicle calibration assistance structure 4). In an embodiment, the processing system is configured to perspectively deform the image 41 which appears on the surface of the target panel 40 as a function of the measurements. Thus, instead of, or in addition to, the operator moving the support structure 3 manually, it is possible to generate an image 41 which can be used to correct any positioning errors.

In an embodiment, the target panel 40 includes a screen (or monitor) and the processing system is configured to transmit to the screen a control signal representing the graphical image 41 to be displayed.

In an embodiment, the system 1 comprises a projector 7. In an embodiment, the projector 7 is positioned above the service area 8. In an embodiment, the processing system is operatively connected to the projector 7 to generate a light beam directed at the surface of the target panel 40 to generate the image 41. Preferably, the distance between the projector 7 and the target panel 40 is known.

In an embodiment, the vehicle calibration assistance structure 4 includes a reflector 6. The reflector 6 is configured to facilitate alignment or calibration of a radar sensor of a safety system of the vehicle 9. In an embodiment, the reflector 6 is mounted removably on the support structure 3 (in addition to or in place of the target panel 40). In an embodiment, the reflector 6 can be positioned at a plurality of positions on the support structure 3 (in particular, at a plurality of heights). In an embodiment, the reflector 6 is rotatable around the support structure 3 or around a horizontal axis (perpendicular to the vertical direction V) to correct its position according to the position of the radar sensor to be adjusted.

In an embodiment, the vehicle calibration assistance structure 4 includes an additional positioning target element attached to the reflector 6. In an embodiment, the matching camera 53 is configured to see the additional positioning target element. In an embodiment, the measurements determined by the processing system include a spatial correlation between the reflector 6 and the vehicle 9 and/or a spatial correlation between the reflector 6 and the support structure 3.

This disclosure also relates to a method for aligning or calibrating a camera of a vehicle 9 positioned in a service area 8.

The method comprises a step of providing a support structure 3 which supports a vehicle calibration assistance structure 4. The vehicle calibration assistance structure includes a target panel 40. The support structure 3 is positioned in such a way that the target panel 40 has one surface facing the service area 8 so that a camera of the vehicle 9 can see the surface of the target panel 40. The step of providing may comprise a step of adjusting the height of the target panel 40 on the support structure 3.

The method preferably comprises a step of providing a positioning device 5. The method comprises a step of viewing a surface of the vehicle through an optical device included in the positioning device 5. In an embodiment, the method comprises a step of viewing, with a matching camera 53, a positioning target element 54 connected to the support structure 3 (or to the vehicle calibration assistance structure 4 or to the target panel 40).

The method preferably comprises a step of aiding with the relative positioning between the vehicle 9, located in the service area 8, and the vehicle calibration assistance structure 4 by processing data from the positioning device 5 in a processing system and determining measurements including a spatial correlation between the vehicle calibration assistance structure 4 and the vehicle 9.

The method comprises a step of generating on the surface of the target panel 40 an image 41 having a predetermined graphical feature (for example, a particular geometric pattern). The graphical feature is selected by an operator based on the vehicle 9 located in the service area 8 or is chosen by the processing system as a function of input data entered by an operator (for example, vehicle make and model). In an embodiment, the image 41 is generated by the processing system on the target panel 40 as a function of the measurements (thus, it may be perspectively deformed as a function of the distance between the target panel 40 and the vehicle 9 and/or of a misalignment between the target panel 40 and the vehicle 9).

In an embodiment, the step of generating the image 41 includes a step of transmitting a control signal representing the image 41 to be displayed to a screen (monitor) included in the target panel.

In an embodiment, the step of generating the image 41 includes a step of transmitting a control signal representing the image 41 to be displayed to a projector 7 configured to project the image 41 on the target panel 40.

The method comprises a step of sending a calibration command to an electronic control unit of the vehicle 9. Preferably, the step of sending the command is carried out by means of an instrument configured to communicate with the electronic control unit of the vehicle 9.

The method comprises a step of viewing the image displayed on the surface of the target panel 40 through the camera of the vehicle 9 to be calibrated.

The method comprises a step of processing data received in the processing system from the electronic control unit of the vehicle 9 (and, in one embodiment, from the vehicle calibration assistance structure 4).

It should be noted that what is described above with reference to the front of the vehicle (and the related sensors and/or cameras) also applies, with the necessary changes made, to the back and sides of the vehicle.

What is claimed is:

1. A calibrating system for calibrating a camera of a vehicle, the calibrating system comprising:
a base unit configured to be moved on a supporting surface;
a support structure connected to the base unit;
a vehicle calibration assistance structure mounted on the support structure, wherein the vehicle calibration assistance structure includes a target panel, which has a surface facing forward towards a service area, wherein the surface of the target panel bears a first combination of predetermined graphical features, and the surface of the target panel is positioned to be seen by the camera of the vehicle while the vehicle is positioned in the service area, wherein the vehicle calibration assistance structure is provided with a second combination of predetermined graphical features, different from the first combination of predetermined graphical features, and wherein the vehicle calibration assistance structure further includes a reflector that reflects electromagnetic waves for calibration of a radar sensor of the vehicle, located in a position interposed between the target panel and the base with respect to a vertical direction, the reflector being movably connected to the support structure so that the reflector is rotatable around the support structure around a horizontal axis perpendicular to the vertical direction, wherein, with respect to the vertical direction, the target panel extends between a target lower end and a target upper end, and the reflector extends between a reflector lower end and a reflector upper end, the reflector upper end being positioned below the target lower end;
a processor, operatively connected to the vehicle calibration assistance structure and programmed to process data received from the vehicle calibration assistance structure and facilitate alignment or calibration of the camera of the vehicle;
a positioning device that aids a relative positioning between the vehicle and the vehicle calibration assistance structure, wherein the positioning device is spaced from the support structure and includes a frame, at least one lateral camera and a matching camera, the at least one lateral camera and the matching camera being connected to the frame, wherein the at least one lateral camera is operatively oriented laterally towards the service area to see graphical features of the vehicle and the matching camera is oriented backwards towards the support structure, to see the second combination of predetermined graphical features,
wherein the processor comprises an electronic controller that processes images taken by the at least one lateral camera and by the matching camera of the positioning device, identifies an actual position of the support structure relative to the vehicle, and generates instructions for aiding a precise manual positioning of the support structure relative to the vehicle, as a function of the actual position and of input data provided by the manufacturer of the vehicle, wherein the processor is operatively connected to the positioning device to receive and process data from the positioning device and, based on the data from the positioning device, determines distance measurements of the distance between the vehicle calibration assistance structure and the vehicle, wherein the processor is connected to an operator interface and generates control signals that control operation of the operator interface to display the instructions that help the operator manually move the base unit to a correct position, based on the distance measurements.

2. The calibrating system according to claim 1, wherein the processor displays on the surface of the target panel an image which provides the first combination of predetermined graphical features visible to the camera of the vehicle.

3. The calibrating system according to claim 2, wherein the operator interface receives the input data comprising an information item, the information item comprising one or more of: a make of the vehicle, a model of the vehicle, a year of manufacture of the vehicle, and an identifier code of the vehicle; and wherein the processor receives the input data from the operator interface, and generates the image as a function of the input data received.

4. The calibrating system according to claim 2, wherein the processor is operatively coupled to the positioning device to receive data therefrom and includes a processor programmed with instructions to process the data received from the positioning device to determine measurements including at least one spatial correlation between the vehicle calibration assistance structure and the vehicle.

5. The calibrating system according to claim 2, wherein the processor displays on the surface of the target panel an additional image which provides the second combination of predetermined graphical features.

6. The calibrating system according to claim 5, wherein the processor displays the additional image on a pair of side portions of the target panel to provide the second combination of predetermined graphical features.

7. The calibrating system according to claim 6, wherein the processor displays the image providing the first combination of graphical features on a central portion of the target panel, interposed between the side portions of the pair of side portions.

8. The calibrating system according to claim 5, wherein the processor displays the additional image and the image one after the other at successive times on the surface of the target panel.

9. The calibrating system according to claim 2, wherein the target panel includes a screen and wherein the processor transmits to the screen a control signal representing the graphical image to be displayed.

10. The calibrating system according to claim 2, further comprising a projector, wherein the processor is operatively connected to the projector to generate a light beam directed at the surface of the target panel to generate the image.

11. The calibrating system according to claim 1, wherein the vehicle calibration assistance structure comprises at least one positioning target element, oriented towards the service area and including a surface bearing the second combination of predetermined graphical features, wherein the positioning target element is supported by the support structure.

12. The calibrating system according to claim 11, wherein the calibration assistance structure comprises a pair of positioning target elements, supported by the support structure and protruding from respective opposite sides of the target panel.

13. A method for aligning or calibrating a camera of a vehicle positioned in a service area, the method comprising:
providing a support structure which supports a vehicle calibration assistance structure, the vehicle calibration assistance structure including a target panel, which has a surface facing forward towards a service area, wherein the surface of the target panel bears a first combination of predetermined graphical features, the vehicle being positioned in the service area so that the camera of the vehicle can see the surface of the target panel, the vehicle calibration assistance structure further including a reflector that reflects electromagnetic waves for calibration of a radar sensor of the vehicle, located in a position interposed between the target panel and the base with respect to a vertical direction, the reflector being movably connected to the support structure so that the reflector is rotatable around the support structure around a horizontal axis perpendicular to the vertical direction, wherein, with respect to the vertical direction, the target panel extends between a target lower end and a target upper end, and the reflector extends between a reflector lower end and a reflector upper end, the reflector upper end being positioned below the target lower end;
sending a calibration command to an electronic control unit of the vehicle;
viewing an image displayed on the surface of the target panel through the camera of the vehicle to be calibrated;
processing data received in a processor from the electronic control unit of the vehicle to facilitate alignment or calibration of the camera of the vehicle;
providing a positioning device;
aiding with the relative positioning between the vehicle, positioned in the service area, and the vehicle calibration assistance structure by means of the positioning device, wherein
the vehicle calibration assistance structure is provided with a second combination of predetermined graphical features, different from the first combination of predetermined graphical features, and the positioning device includes at least one lateral camera and a matching camera;
wherein during the step of aiding with the relative positioning between the vehicle and the vehicle calibration assistance structure:
the positioning device is spaced from the support structure,
the at least one lateral camera is oriented in a lateral direction towards the service area, and
the matching camera is oriented backwards, towards the support structure;
and wherein the step of aiding with the relative positioning between the vehicle and the vehicle calibration assistance structure includes:
viewing graphical features of the vehicle through the at least one lateral camera,
viewing the second combination of predetermined graphical features through the matching camera,
processing images taken by the at least one lateral camera and by the matching camera of the positioning device, to identify an actual position of the support structure relative to the vehicle,
processing data received from the positioning device to determine distance measurements of the distance between the vehicle calibration assistance structure and the vehicle; and
generating instructions for aiding a precise positioning of the support structure relative to the vehicle, as a function of the actual position and of input data provided by the manufacturer of the vehicle, wherein the processor provides the instructions through an operator interface, the instructions being configured to help the operator to manually move the base unit to a correct position, based on the distance measurements.

14. The method according to claim 13, further comprising:
generating on the surface of the target panel an image representing the first combination of predetermined graphical features visible to the camera of the vehicle.

15. The method according to claim 13, further comprising:
generating on the surface of the target panel an additional image having a second combination of predetermined graphical features visible to the matching camera of the positioning device, wherein the additional image and the image are generated in different zones and/or at different time instants.

16. The calibrating system according to claim 1, wherein the base unit includes wheels and is movable on the supporting surface through the wheels.

17. A calibrating system for calibrating a camera of a vehicle, the calibrating system comprising:
a base unit configured to be moved on a supporting surface;
a support structure connected to the base unit;
a vehicle calibration assistance structure mounted on the support structure, wherein the vehicle calibration assistance structure includes a target panel, which has a surface facing forward, towards a service area, wherein the surface of the target panel bears a first combination of predetermined graphical features, and the surface of the target panel is positioned to be seen by the camera of the vehicle while the vehicle is positioned in the service area and wherein the vehicle calibration assistance structure further includes a reflector that reflects electromagnetic waves for calibration of a radar sensor of the vehicle, removably connected to the support structure in a position vertically interposed between the target panel and the base, wherein, with respect to the vertical direction, the target panel extends between a target lower end and a target upper end, and the reflector extends between a reflector lower end and a reflector upper end, the reflector upper end being positioned below the target lower end;
a processor, operatively connected to the vehicle calibration assistance structure and programmed process data received from the vehicle calibration assistance structure and to facilitate alignment or calibration of the camera of the vehicle;
a positioning device that aids a relative positioning between the vehicle and the vehicle calibration assistance structure, wherein the positioning device is spaced from the support structure, includes wheels and is movable on the supporting surface through the wheels, the positioning device further including at least one lateral camera operatively oriented laterally towards the service area to see graphical features of the vehicle, and a matching camera oriented backwards towards the support structure, to see the second combination of predetermined graphical features;

wherein the processor is configured to process images taken by the at least one lateral camera and by the matching camera of the positioning device, to identify an actual position of the support structure relative to the vehicle, and is further configured to generate instructions for aiding a precise manual positioning of the support structure relative to the vehicle, as a function of the actual position and of input data provided by the manufacturer of the vehicle, and wherein the processor provides the instructions through an operator interface, the instructions being configured to help the operator to manually move the base unit to a correct position.

\* \* \* \* \*